United States Patent [19]

Kleiber

[11] Patent Number: 4,940,984

[45] Date of Patent: Jul. 10, 1990

[54] TRANSMITTING STATION FOR A NAVIGATION SYSTEM COMPRISING A MAIN TRANSMITTER AND A STAND-BY TRANSMITTER, PARTICULARLY TRANSMITTING STATION FOR THE MLS MICROWAVE LANDING SYSTEM

[75] Inventor: Herbert Kleiber, Ludwigsburg, Fed. Rep. of Germany

[73] Assignee: 501 Standard Elektrik Lorenz AG, Stuttgart, Fed. Rep. of Germany

[21] Appl. No.: 326,621

[22] Filed: Mar. 21, 1989

[30] Foreign Application Priority Data

Mar. 29, 1988 [DE] Fed. Rep. of Germany ....... 3810628

[51] Int. Cl.$^5$ .............................................. G01S 7/40
[52] U.S. Cl. .................................... 342/173; 455/115
[58] Field of Search ................ 342/408, 173; 455/115, 455/101, 103

[56] References Cited

U.S. PATENT DOCUMENTS 3,085,245  4/1963  Wilson et al. ...................... 455/103
4,541,121  9/1985  Blum .................................. 455/115
4,757,316  7/1988  Brault et al. ........................ 342/173

OTHER PUBLICATIONS

"New Family of Tacan and DME Equipment", G. Bertocchi, Electrical Communication-vol. 58, No. 3, 1984, pp. 289-292.
G. Bertocchi: "Eine Neue Familie von Tacan und DME Anlagen"-*Elektrisches Nachrichtenwesen*, vol. 58, No. 3, 1984.

Primary Examiner—Theodore M. Blum
Attorney, Agent, or Firm—CP&H Christie, Parker & Hale

[57] ABSTRACT

A transmitting station for a navigation system with dual transmitters (20A, B) is disclosed in which the dummy load, which commonly terminates the active-standby transmitter instead of the antenna system, and the associated high-performance changeover switch are omitted. Instead, the two transmitters are operated in constant alternation. This permits better monitoring with less costly and complicated equipment.

3 Claims, 1 Drawing Sheet

# TRANSMITTING STATION FOR A NAVIGATION SYSTEM COMPRISING A MAIN TRANSMITTER AND A STAND-BY TRANSMITTER, PARTICULARLY TRANSMITTING STATION FOR THE MLS MICROWAVE LANDING SYSTEM

TECHNICAL FIELD

The present invention relates to a transmitting station for a navigation system, particularly to a transmitting station for the MLS microwave landing system.

CLAIM FOR PRIORITY

This application is based on and claims priority from an application first filed in Fed. Rep. Germany on 29 Mar 1988 under Ser. No. P38 10 628.0. To the extent such prior application may contain any additional information that might be of any assistance in the use and understanding of the invention claimed herein, it is hereby incorporated by reference.

BACKGROUND ART

The runway equipment for the MLS usually includes four transmitting stations which are distributed around the runway in a particular manner and transmit on the same frequency in a predetermined time sequence. Each transmitting station has a main transmitter and a stand-by transmitter, an antenna changeover switch, and various antennas. To improve the reliability of operation, the duplicate devices are frequently operated simultaneously and monitored separately. The power outputs must then be switchable to the load and to a dummy load and sufficiently isolated from each other. The dummy load must be matched to the power outputs in the same manner as the load to be supplied, and must be able to absorb the same power. In addition, energy consumption is unnecessarily high. Such a transmitting station, though not designed for the MLS, is described by G. Bertocchi, "Elektrisches Nachrichtenwesen", Vol. 58, No. 3, 1984, pages 289 to 292, especially in the passage relating to FIG. 1.

DISCLOSURE OF INVENTION

It is the object of the present invention to provide a transmitting station for a navigation system which can be monitored in a simpler, but equally efficient manner.

According to the invention, in a transmitting station for a navigation system with duplicate transmitters, the dummy load, which commonly terminates the active-standby transmitter instead of the antenna system, and the associated high-performance changeover switch are thus omitted. Instead, the two transmitters are operated in constant alternation. This permits better monitoring with less complicated and costly equipment.

BRIEF DESCRIPTION OF DRAWINGS

The invention will now be explained in greater detail with the aid of an embodiment illustrated in the accompanying drawing, in which.

BEST MODE FOR CARRYING OUT THE INVENTION

Figure 1:
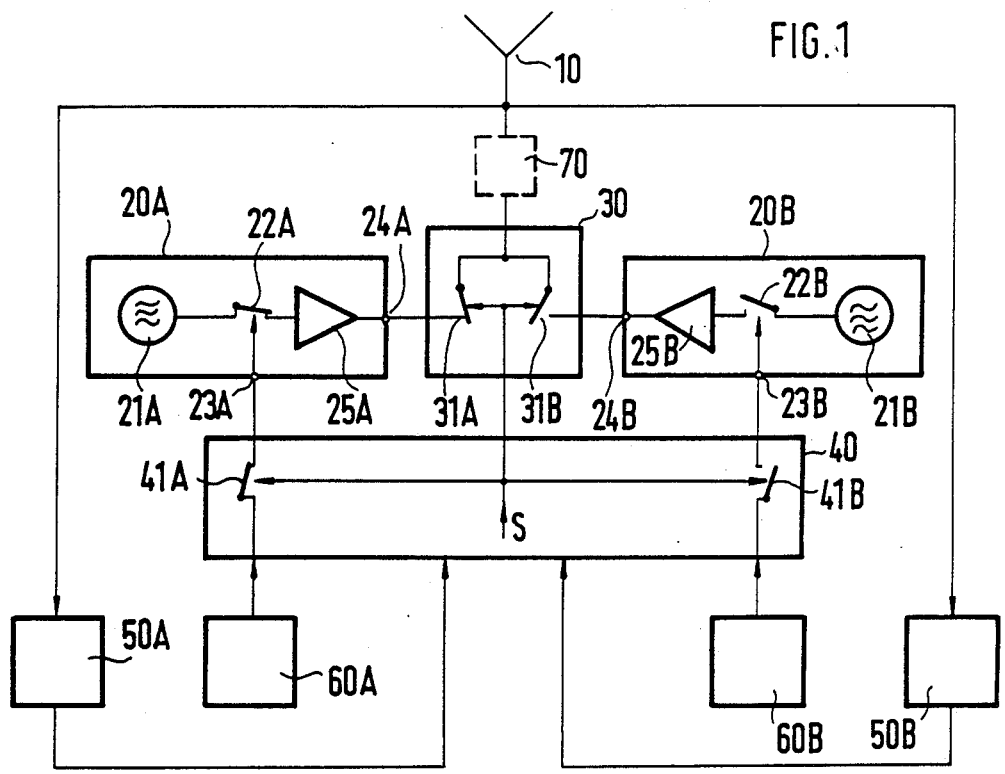
FIG. 1 shows a transmitting station for the MLS microwave landing system in accordance with the invention.

The transmitting station shown in the function block diagram of FIG. 1 includes an antenna system 10, illustrated here as a single antenna, two identical transmitters 20A and 20B, an antenna changeover unit 30, a controller 40, two identical monitoring devices 50A and 50B, and two identical signal generators 60A and 60B. The transmitters 20A and 20B are shown not as they are actually constructed, but merely as they appear to function to an external observer. The actual construction of such a transmitter is familiar to those skilled in the art, however. In each transmitter, a radio-frequency generator 21A, 21B acts on a power amplifier 25A, 25B, which delivers radio-frequency power through a power output 24A, 24B to the antenna system 10. A switch 22A, 22B between the radio-frequency generator 21A, 21B and the power amplifier 25A, 25B serves to key the transmitter on an off. This keying is effected by a digital signal applied at a signal input 23A, 23B.

The antenna changeover unit 20 connects either the power output 24A of the transmitter 20A via a switch 31A or the power output 24B of the transmitter 20B via a switch 31B to the antenna system 10. The changeover is controlled by an external signal S. The prior art requires a second pair of switches by which the output of the respective transmitter which is not connected to the antenna system 10 but is active is connected to a dummy load, these switches having to be high-performance coaxial switches for the reasons mentioned above. In the embodiment being described, the antenna changeover unit 30 can even be omitted and the power outputs 24A and 24B connected together directly if, by suitable design of the transmitter outputs and proper choice of line lengths, the transmitter which is off does not influence the matching of the other transmitter to the antenna system.

The respective active transmitter 20A or 20B is fed via its signal input 23A, 23B with the digital signal by which it is to be keyed. This signal could come from a common signal source, but in the present example, it is generated, again for safety and reliability reasons, in the two signal generators 60A and 60B, which duplicate each other. During error-free operation, both signal generators 60A and 60B provide the same output signal, even though not necessarily in exact synchronism. In the MLS, the signal generators of all transmitting stations involved are connected with one another.

According to the invention, the outputs of the signal generators 60A and 60B are connected to the signal inputs 23A and 23B of the transmitters 20A and 20B not directly, but via a controller 40. The latter contains two switches 41A and 41B by which either the signal generator 60A or the signal generator 60B can be connected to the signal input 23A of the transmitter 20A or the signal input 23B of the transmitter 20B, respectively. The switches 41A and 41B are controlled by the same signal S which controls the switches 31A and 31B in the antenna changeover unit 30. Under normal conditions, e.g., during error-free operation, switching is effected between the duplicate devices at regular intervals by the signal S and the switches 41A and 41B.

The individual intervals must be so long that with respect to all properties, i.e., also with regard to the heating of the unit and the loading of the voltage sources, the same condition as during operation of only one unit is reached. In the MLS, the individual transmitting stations are active one to three times for about 7 to 10 $s^{-6}$ within a time frame of 75 $s^{-6}$. A regular change initiated by the controller 40 after every 75 $s^{-6}$ would thus suffice to continuously monitor the transmitters 20A and 20B. These time frames of about 75 $s^{-6}$ are tied into a cycle which is repeated about every 600 $s^{-3}$. To be able to fully include the signal generators 60A and 60B in the monitoring, the switching in the controller 40 is advantageously coupled to this cycle of 600 $s^{-3}$. To this end, the controller 40, like the signal generators 60A and 60B, must be connected to the other transmitting stations. This is not shown in the drawing.

The switching can occur not only at the point described with the aid of FIG. 1, but at any point from which the transmitter can be keyed, directly or indirectly. This can be done both within the transmitters 20A and 20B and within the signal generators 60A and 60B. Furthermore, it is not necessary for the signal generators 60A and 60B to be duplicated, as is shown in FIG. 1. With duplicate signal generators, however, it is possible in the event of an error to cross-connect the signal generators and transmitters crosswise as a trial so as to isolate the error and, on the other hand, to slightly further improve the reliability and safety of operation if two errors should occur simultaneously. To do this, the controller 40 would have to be capable of connecting the signal generator 60A to the transmitter 20B or the signal generator 60B to the transmitter 20A. Switching at two or more points of the signal flow is also possible.

When an error is indicated to the controller 40, the portion found to be faulty will no longer be activated, and the other portion will handle all functions alone until a repair has been made. In the present example, errors are detected by means of the two identical monitoring devices 50A and 50B. No switching occurs between them, i.e., they operate simultaneously and, thus, monitor each other. In the simplified representation of FIG. 1, both monitoring devices 50A and 50B are coupled directly to the antenna system 10. What is important is that the monitoring devices 50A and 50B measure at a point where both the output power of the transmitter 20A and that of the transmitter 20B are measurable. This can be done by means of a directional coupler in the feeder to the antenna system 10, but it is also possible to monitor the output levels by reception in the near or far field, for example. In this embodiment, like in the system described by G. Bertocchi, two monitoring devices are provided. Being connected in parallel, however, they monitor each other, thus eliminating the need for complicated procedures to monitor the monitoring device, as is described by G. Bertocchi. On the other hand, use could be made of a nonduplicated monitoring device which would have to monitor itself by suitable procedures. In any case, the cost and complexity of the monitoring equipment are clearly reduced. The monitoring devices of the individual transmitting stations as well as any central monitoring devices are also connected with one another.

In FIG. 1, a power amplifier 70 is indicated in the feeder to the antenna system 10 by broken lines. Frequently, the transmitter is duplicated only up to the driver stage, as is also described in the article by G. Bertocchi. Duplication of the power amplifier can be dispensed with if the power amplifier consists of a plurality of identical amplifiers in parallel which are so interconnected that the failure of any of the amplifiers will not affect the other amplifiers and reduce only the total power output. The MLS does not include such a power amplifier.

Figure 2:
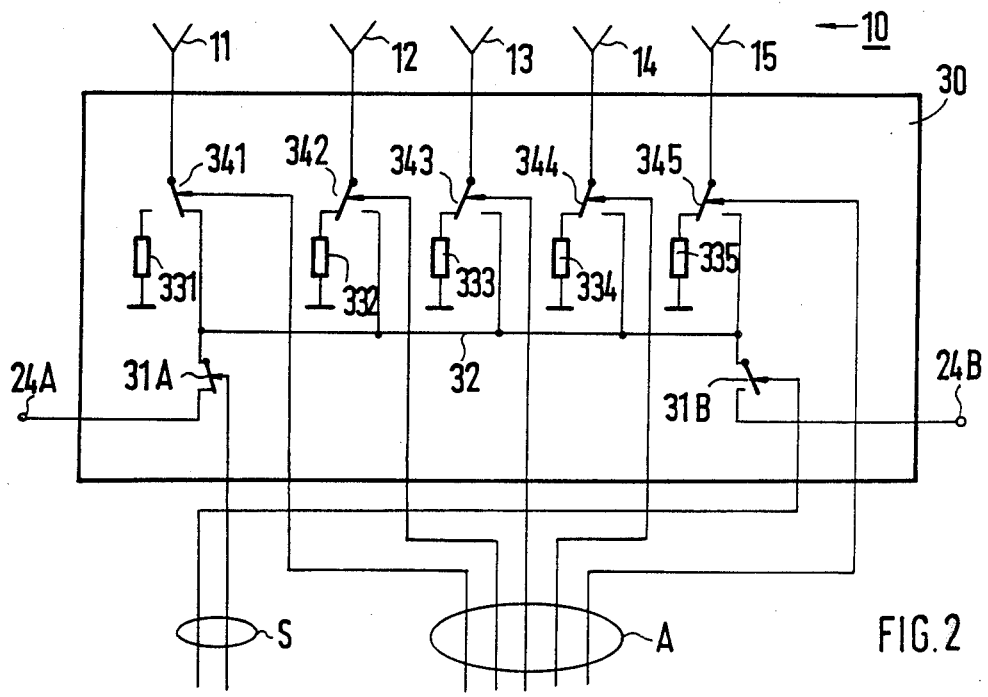
FIG. 2 shows an antenna changeover unit for the transmitting station of FIG. 1.

FIG. 2 shows that in a transmitting station according to the invention, the antenna changeover unit 30 can be of a very simple design. Both the power outputs 24A and 24B of the two transmitters and the feeders to the antenna system 10 can be connected to a node 32 via simple switches. In the example, these are, on the one hand, the abovementioned switches 31A and 31B and, on the other hand, five changeover switches 341 to 345, by which the five antennas 11 to 15, which form the antenna system 10, can be either connected to the node 32 or grounded through load resistors 331 to 335. If the power is not too high, all switches and changeover switches can be implemented with simple and closely spaced PIN diode switches. In the prior art, high-performance coaxial switches are necessary at least for the switching between the power outputs, which requires a spatial separation from the changeover switches for the individual antennas. The implementation of switches and changeover switches in PIN diode technology is familiar to the person skilled in the art. The control of the switches and changeover switches, which is effected over DC paths, is only outlined in FIG. 2. The switches 31A and 31B are controlled by the signal S, and the changeover switches 341 to 345 by a signal A, whose origin is not shown in FIG. 1.

I claim:
1. Transmitting station for a navigation system said transmitting station comprising
    a first transmitter having a first power output terminal and a first control input terminal via which power at the first power output terminal can be switched off,
    a second transmitter in parallel to and functionally interchangeable with the first transmitter, said second transmitter having a second power output terminal and a second control input terminal via which power at the second power output terminal can be switched off,
    a common antenna system having an antenna input terminal coupled to both the first power output terminal and the second power output terminal for transmitting a navigation signal,
    a monitoring device which monitors the navigation signal output from the common antenna system and delivers an error message in the event of an error,
    controller means coupled to said first and second control inputs and responsive to the error message from the monitoring device for, in the absence of said error message, causing at times when neither of the transmitters is delivering any such output power the first and second transmitters to alternate with each other in delivering power to the antenna input terminal and, in response to said error message, causing only the transmitter not transmitting at the time the error occurred to constantly deliver power to said antenna input terminal, and
    a changeover switch interposed between the antenna system input terminal and said first and second power output terminals, said changeover switch being controlled by the controller means and disconnecting a respective inactive one of the first and second transmitters from the common antenna system,
whereby the particular transmitter not connected to the common antenna system is not delivering any output power, thereby eliminating any need for a second an- tenna system and/or a dummy load to be connected to said particular transmitter.

2. A transmitting station as claimed in claim 1, wherein the changeover switch is implemented as a plurality of PIN diode switches.

3. A transmitting station as claimed in claim 1, wherein the navigation system is a MLS microwave landing system.

* * * * *